US011036885B1

(12) United States Patent
Abdelkader et al.

(10) Patent No.: US 11,036,885 B1
(45) Date of Patent: Jun. 15, 2021

(54) SYSTEM AND METHOD FOR IDENTIFYING, STORING, TRANSMITTING, AND OPERATING ON DATA SECURELY

(71) Applicant: Very Good Security, Inc., San Francisco, CA (US)

(72) Inventors: Mahmoud Abdelkader, San Francisco, CA (US); Marshall Jones, San Francisco, CA (US); Gordon Young, Chandler, AZ (US); Timothy Nguyen, Palo Alto, CA (US)

(73) Assignee: VERY GOOD SECURITY, INC., San Francisco, CA (US)

( * ) Notice: Subject to any disclaimer, the term of this patent is extended or adjusted under 35 U.S.C. 154(b) by 341 days.

(21) Appl. No.: 16/241,923

(22) Filed: Jan. 7, 2019

Related U.S. Application Data

(60) Provisional application No. 62/614,374, filed on Jan. 6, 2018.

(51) Int. Cl.
| | |
|---|---|
| *G06F 21/62* | (2013.01) |
| *G06K 9/62* | (2006.01) |
| *G06F 21/60* | (2013.01) |
| *H04L 29/08* | (2006.01) |

(52) U.S. Cl.
CPC ........ *G06F 21/6254* (2013.01); *G06F 21/606* (2013.01); *G06K 9/6267* (2013.01); *H04L 67/2876* (2013.01)

(58) Field of Classification Search
CPC . G06F 21/6254; G06F 21/606; H04L 67/2876
See application file for complete search history.

(56) References Cited

U.S. PATENT DOCUMENTS

| | | | |
|---|---|---|---|
| 9,654,507 B2* | 5/2017 | Gangadharappa | ...... H04L 63/08 |
| 9,935,955 B2* | 4/2018 | Desai | .................. H04L 63/0281 |
| 10,826,940 B2* | 11/2020 | Narayanaswamy | .. G06F 16/951 |
| 2017/0310692 A1* | 10/2017 | Ackerman | .......... H04L 63/1425 |
| 2017/0310693 A1* | 10/2017 | Howard | .............. H04L 63/1425 |
| 2017/0310703 A1* | 10/2017 | Ackerman | .......... H04L 63/1425 |
| 2018/0097832 A1* | 4/2018 | Viktorov | ............. H04L 63/1425 |
| 2018/0191718 A1* | 7/2018 | Kuzkin | ................... H04L 63/18 |
| 2019/0095310 A1* | 3/2019 | Liran | .................. G06F 11/3438 |
| 2019/0190890 A1* | 6/2019 | Druker | .................... G06F 21/62 |

* cited by examiner

*Primary Examiner* — Lynn D Feild
*Assistant Examiner* — Viral S Lakhia
(74) *Attorney, Agent, or Firm* — Staniford Tomita LLP

(57) ABSTRACT

A data security server system includes a first network proxy, a data classifier, an operation pipeline module, a vault database, security infrastructure, and second network proxy that function as secure data tunnel mechanisms through which network data containing sensitive information passes through. The data classifier identifies data payloads having data fields that require processing and routes these data payloads to an operation pipeline module which can redact, tokenize or otherwise process sensitive data before the data payload exits the system. The data classifier also reverses the process by identifying data payloads having redacted or tokenize data fields and restoring the sensitive data to these data fields.

13 Claims, 13 Drawing Sheets

Operation Workflow Diagram

Operation Workflow Diagram

SYSTEM AND METHOD FOR IDENTIFYING, STORING, TRANSMITTING, AND OPERATING ON DATA SECURELY

CROSS REFERENCE TO RELATED APPLICATIONS

This application claims priority to U.S. Provisional Patent Application No. 62/614,374, "System And Method For Identifying, Storing, Transmitting, And Operating On Data Securely" filed Jan. 6, 2018, which is incorporated by reference in its entirety.

BACKGROUND

Security and Privacy are substantial issues facing on-line business and communications. Cybersecurity attacks and data security breaches often result in compromised sensitive information. In these incidents, confidential information including personal, financial, confidential, corporate information may be made accessible to nefarious entities. This in turn has led to increased regulatory and industry controls requiring additional data traceability, oversight of data usage, sharing, and security. What is needed is an improved system and method for identifying and securely storing, transmitting, and operating on data.

SUMMARY OF THE INVENTION

The inventive system can provide bi-directional data processing and is able to process end-point responses in-line. The inventive system provides access control, granular read/write permissioning, alerting and audit logging on open system interconnection (OSI) layer 7 (Application Layer Data). This structure allows the inventive system to be easily and seamlessly used with other systems to allow more secure communications in and between business to business (B2B) and business to customer (B2C) systems as well as enabling more secure operations on sensitive data.

In inventive system can be an improvement over the prior art because it can be configured as a SaaS based, Agentless Secure Proxy. The inventive software as a service (SaaS) based agentless security proxy system in combination with real-time centralized logging can enable real time analytics and neural network type alerting and intrusion detection system (IDS) features and cloud access security brokers (CASB) services without requiring installation and configuration of agents. The inventive system can provide quick and transparent integration with minimal code change. The inventive system can provide Data Centric approach vs. Defense in Depth approach. The inventive system can use policy driven data lineage enforcement. The inventive system can provide data provenance tracking and management. The inventive system can provide transport level vs. code level integration. The inventive system can use dynamic rule creation and enforcement. The inventive system can enrich traffic at the data/application layer level. The inventive system may not only perform tokenization and de-tokenization, but may also perform the functions of adding or removing data to specified routed/processed customer data. For example, appending data to original information requests or responses. For example, when submitting information to an end point adding pre-specified additional data, to either the submission or to the resulting response (e.g. appending a risk score or approval response flag to a tokenized or routed identity data payload).

In an embodiment the system can provide Compliance-as-a-Service Cloud architecture. Chained compliance, both descoping customer systems/networks and enabling compliance economies of scale for onsite audits and other data security controls. For example, one major audit can be employed to review all customers and customer integrations utilizing the system. The system can provide a Native Zero-Trust data-lifecycle, strong authentication, authorization, audit & control. Payload inspection and selective payload rewriting can be performed by the inventive system. In an embodiment, the system can provide custom universally unique identifier (UUID) tokenizing enabling clear contextual linkage between tokens, related events, policies, and stakeholders. The UUID can be very helpful in interpreting what information the tokens represent, how they have been utilized, and system integrity. This can make the token system more efficient.

The system can also have the ability to develop applications on top of the system to securely run/interface with data secured by the system. These applications can provide custom data residency routing, provide a secure environment for running custom code on sensitive data, provide custom tokenization/key value schemes, and selective automated handling or routing of data to third party service providers. These applications may also be configured to securely interface with other applications built on top of the system.

The inventive system can provide various advantages over the prior art. For example, the system can have dynamically configured rules to provide more customizability and extensibility. The system can have the ability to inspect and selectively tokenize or redact parts of a data payload. This feature can tokenize or remove sensitive information from data being transmitted or from data being received. The system can have the ability to selectively enrich data submitted (transmitted) as well as enrich data received.

The inventive system can have the following advantages: Minimal integration: (transport vs code), Agentless, SaaS deployment, lightweight directory access protocol (LDAP)-less permissioning and role-based access control (RBAC). The system can use dynamic tokenization which can pre-configure tokens to have any of the following features: expire after a time limit, expire after a specific number of uses, work only for a specific person, role, or entity, work based on limited characteristics (geo fencing, ip-whitelisting, behavioral signature, device fingerprint). The inventive system can use various dynamic token types including: Images by coordinates, PDF by coordinates, pages, lines, or sections, JSON by field (nested or otherwise), CSV, XML, and string/credentials. The system can use multiple transport types including: HTTP, SFTP, and TCP. The system can enable compliance as a service. Since users can easily integrate the system, the system can allow users to use their own security keys, use their own data vault and use their own tokenization format if desired.

DETAILED DESCRIPTION

The present invention is directed towards a system for intercepting and then dynamically identifying, securing, monitoring, governing and interfacing with sensitive data in-line. In an embodiment, the system comprises a network infrastructure, rules configuration tooling, and a forward proxy and a reverse proxy. In an embodiment, the system can be utilized for intercepting, selectively processing, and routing data payloads or portions of data payloads as well as governing overall usage and distribution of intercepted data. The system can perform data processing includes redacting, revealing, tokenizing, mapping, enriching, splitting, or otherwise operating on any portion of a received data payload.

Figure 1:
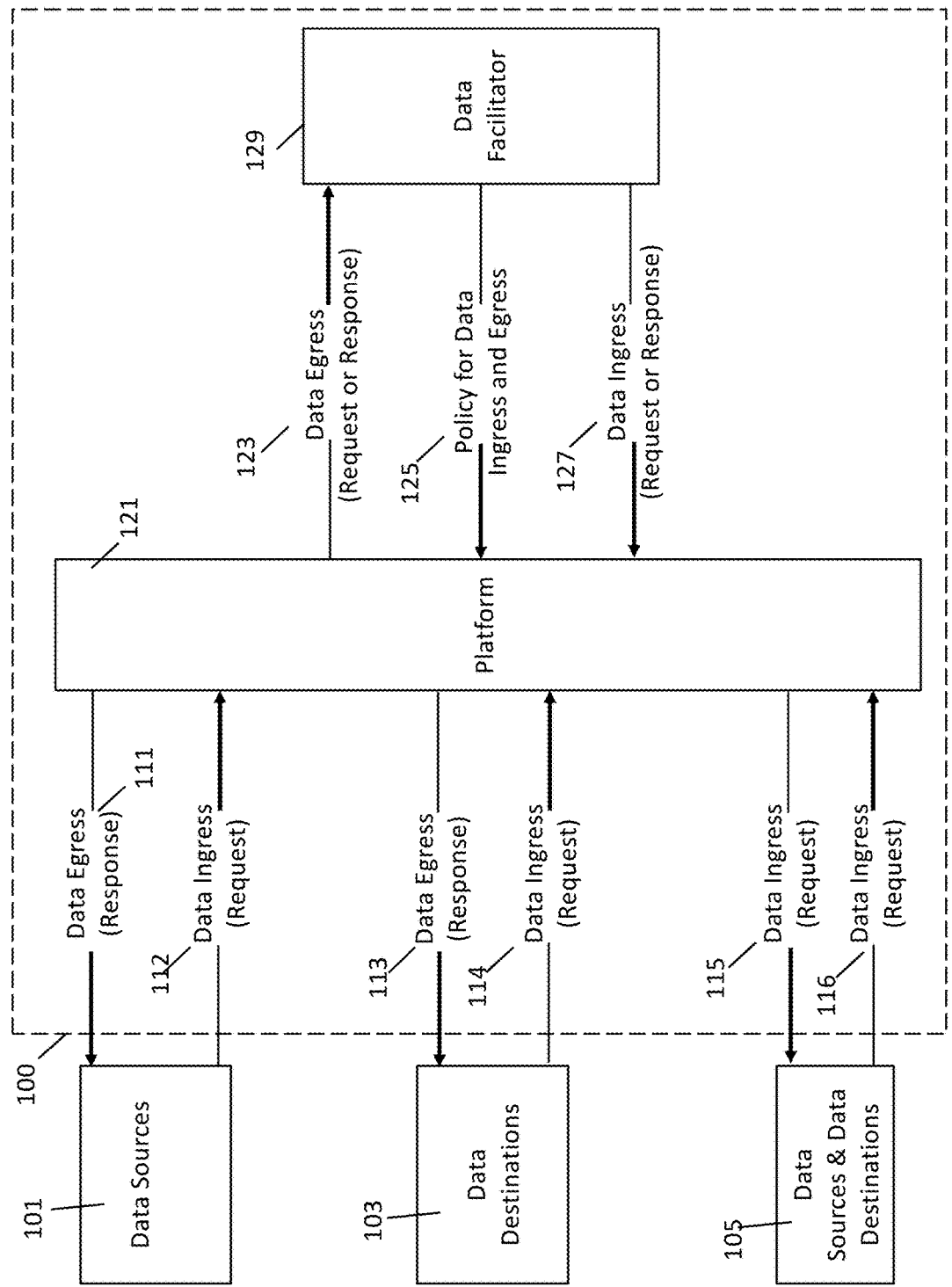
FIG. 1 illustrates a block diagram of an embodiment of a data processing system illustrating data relationships.

FIG. 1 is a system component data relationship diagram which illustrates an embodiment of the flow of data in relation to the type of stakeholders utilizing the inventive platform network 100 which can include the system platform and any customers who are using computing devices which have user accounts and communicate with the platform network 100. The system platform network 100 also communicates with data sources 101, data destinations 103 and data sources & data destinations 105 which can be out of the network 100. In the descriptions of data processing, data entering the platform 100 is described as "ingress" data and data leaving the platform 100 is described as "egress" data. In the descriptions a "request" can be a data payload made to or routed through the platform 100 and a "response" can be a data payload sent in response to a request made to or passed along by the platform 100. Data Sources 101 can provide requests 112 in the form of data ingress to the system platform 121 and the data sources 101 can optionally receive responses 111 from the system Platform 121. The requests 112 can be data ingress to the system platform 121 and the responses 111 can be data egress from the system platform 121.

This basic system can be applied to various transactional applications. For example, in an embodiment a data source 101 can be a computing device of a credit card holder. The data source 101 can provide the user's credit card information through a data ingress request 112 to the system platform 121 which can forward the data as a data egress request 123 to the data facilitator 129 for processing. The data facilitator 129 can process the request 123 according to policies form the system platform network 100 and transmit data ingress request 127 to the platform 121 and then as data egress request 113 to a data destination 103.

The Data Destination 103 can receive a data egress response 113 which has been routed through the system platform 121 and can optionally provide a data ingress request 114 which can be returned to the data sources 101 through the platform 121. For example, payment processor information which the inventive system platform 121 could route as card data in the data egress response 113 which includes payment instructions to the data destination 103 and the data destination 103 can transmit a data ingress response 114 confirming a purchase which can be transmitted as a data egress response 111 through the platform 121 back to the data source 101.

In an embodiment, the Data Facilitator 129 can be a structure utilizing the system platform 100 to obtain request and response ingress data, that operates on the platform network 100 to process the ingress data and produce egress data. The data facilitator 129 processing of data can include: redacting, encrypting and storing, enriching, revealing, etc. The platform network 100 can route the data egress/ingress and handle data responses between the data sources 101, data destinations 103, data sources & data destinations 105, and the data facilitator 129. These data facilitator 129 customers can utilize the platform 100 features to not only initiate requests, handle responses, and orchestrate operations and data routing, but also set policies 125 generally over the types of data ingressed 127 or data egressed 123 through the system platform 100.

Figure 2:
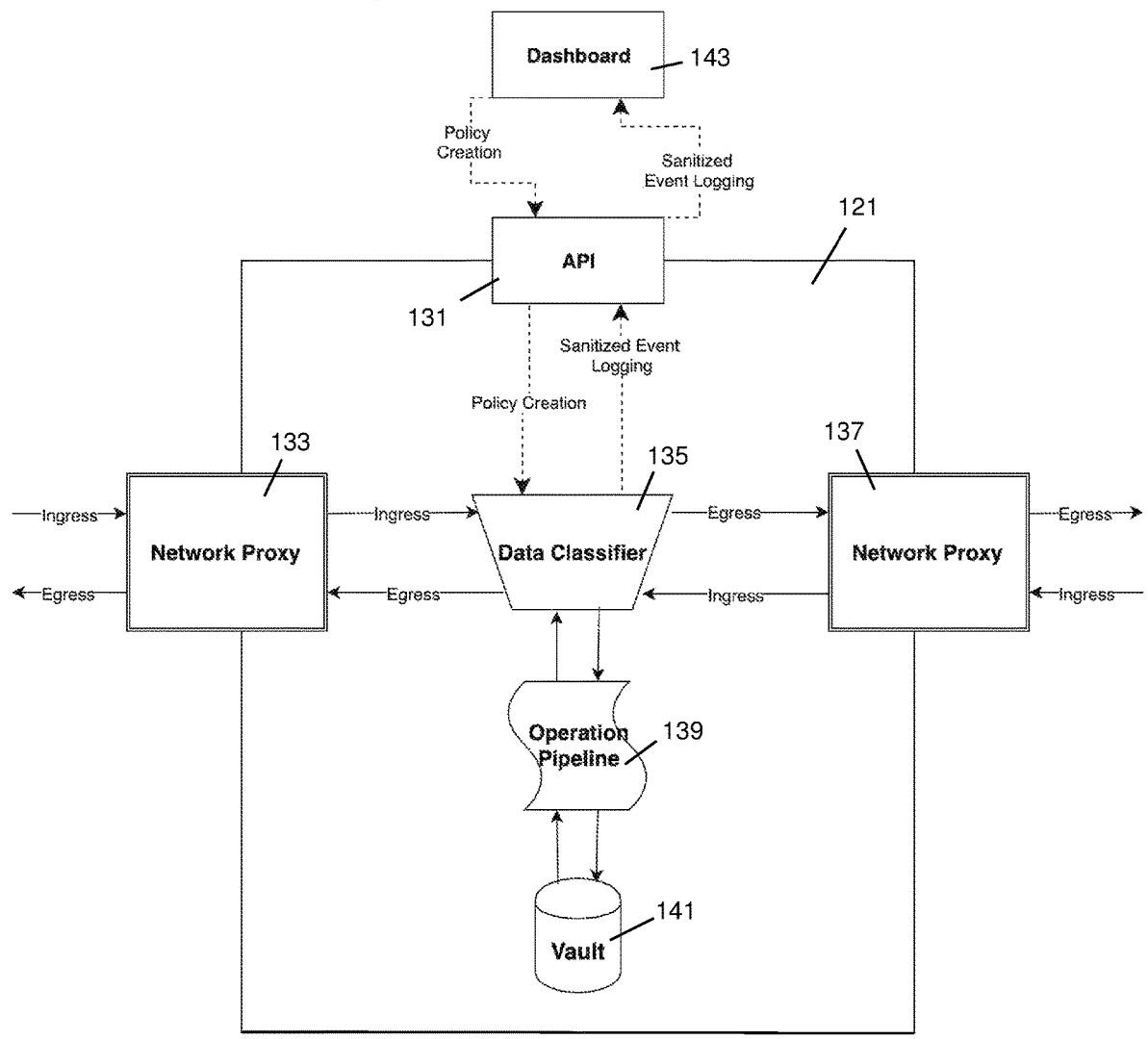
FIG. 2 illustrates a block diagram of a network proxy embodiment of a data processing system.

FIG. 2 illustrates a more detailed block diagram of an embodiment of the system platform 121 which can include: a forward network proxy 133, a data classifier 135, a reverse proxy 137, a customer Application Program Interface (API) 131, a dashboard 143, an operation pipeline 139 and a vault 141. Data ingress can be a request that is received through the first network proxy 133 to the data classifier 135. The data classifier 135 can create and enforce policy on the data based on data characteristics such as: classification, provider, recipient or some other combination of payload characteristic. The data classifier 135 can communicate with an API 131 which can communicate with a dashboard 143. A system user can interact with the dashboard, which can have a user interface to create and configure policies for the system 121 which are transmitted through the API 131 to the data classifier 135. The policies can describe a set of conditions that define when operations are applied to data as it passes through a proxy 133, 137. When the operation conditions are evaluated to be true for data ingress through the proxy 133, then a set of operations (pipeline 139) are executed according to the configured policies in a data detection phase.

The data classifier 135 can decide if a specific operation pipeline 139 should be applied to the data ingress through the proxy 133. More specifically, the data classifier 135 can analyze the data fields of the of the data ingress through the network proxy 133 are data fields that need to be processed. If the data classifier 135 determines that no processing is required, the data can be transmitted directly through the data classifier 135 to the reverse network proxy 137. However, if the data classifier determines that a specific operation needs to be applied to the data based upon a policy, the data classifier 135 can direct the data payloads through the operation pipeline 139. Actions that may be taken on a data payload or some subsection of a data payload can include: "Security Operations" which are classes of operation that handles tokenization, redaction, enrichment, and redaction strategies, and "Storage Operations" which are classes of operations that involves or impacts the creation or storage of data through the system platform. The operation pipeline 139 can process the data ingress and transmit the processed data payloads back to the data classifier 135 which can then transmit the data as egress data to the reverse network proxy 137. In an embodiment, the operation pipeline 139 can be transmitted to a vault 141 which can be a hardened infrastructure and database that is used to securely store data. As the system 121 processes ingress and egress data, the data classifier 135 can monitor, track, and perform data analytics. In an embodiment, the data classifier 135 can provide sanitized event logging information to the API 131 which can transmit the sanitized event logging information to the dashboard 143 which can display the information to a system user. In an embodiment sanitized data can be data that has had personal and private information redacted.

The first network proxy 133 and the reverse network proxy 137 (aka "Middleboxes") can function as secure data tunnel mechanisms through the data classifier that can perform various tasks to pass through data transmitted into the first network proxy 133 and out the reverse network proxy 137 and conversely into the reverse network proxy 137 and out the first network proxy 133. These Middleboxes can include, but are not limited to one or more of the following types of tools: reverse proxy, forward proxy, etc.

In a Reverse Proxy application, the system 121 can be used in front of an upstream Data Source. The operation pipeline 139 can redact, reveal, and/or enrich payload data as it passes through the system 121. In a customer (Data Facilitator) usage embodiment, the system 121 can be used as a reverse proxy positioned in front of a customer's own API. The system 121 can act as a back-end service for clients' APIs. One typical usage is to allow the collection and securing of sensitive data by the system 121 such as sensitive or confidential information from: clients, customers, financial institutions, other data providers, or other information sources before sending data to customer API. The data classifier 135 can also take an ingress response initiated by customer's API containing a token from the system 121 platform and replacing/revealing the token by the operation pipeline 139 and routing the responses on to third parties as needed for customers' business without exposing the secured data to customer computing devices or customer's API and system.

In an embodiment, the system 121 can also use the reverse network proxy 137 to receive the payment information from a customer computing device. In this example, the customer computing device would send the payment information via the system secure form or JavaScript through the system reverse proxy 137. In transit, the data classifier 135 redirects the sensitive payment instrument information ingress data through the operation pipeline 139 to a secure system vault 141. The system vault 141 of the system 121 can send a corresponding token through the data classifier 135 as egress data through the network proxy 133 to a business' back-end servers. Simultaneously, the vault 141 can return a response through the operation pipeline 139, data classifier 135 as egress data through the reverse network proxy 137 to the client/service used to collect the payment information from customer computing devices.

In a Forward Proxy application, the system 121 can be placed in the stream of traffic from a data stream or network. In different configurations, the system 121 can redact, reveal, and/or enrich data as the data passes through the system 121. For example, in a forward proxy "customer" (Data Facilitator) usage, data can be transmitted through a network proxy 133 as ingress data, the data classifier 135 can divert the ingress data through the operation pipeline 139 to the vault 141. The operations pipeline 139 can perform processing of the data which can consist of any combination of redact, reveal, enrich, and/or otherwise operations on data utilizing or editing data stored in the vault as required and then transmitting the processed data through the data classifier 135 and the reverse network proxy 137 out of the system 121 as egress data. The system 121 can be used by a user's server software to send requests to the third-party services. The system 121 can be used to reveal the request data to the third-party services or redact the third-party service responses without involving non-system infrastructure and keeping those systems out of scope of the sensitive data compliances.

In a subscription billing model Forward Proxy application example, the system 121 can use a token that represents the customer's payment information in a back-end system that is used to charge that customer's payment information. In this example, a billing system would send a payload to debit the customer with that token through the system 121 via the forward proxy application. In transit, the forward proxy application, the system 121 would replace that token with the customer's sensitive payment information and forward that payload to any selected end-payment processor so that they could charge the customer and return a response to the client/service used to collect the customer's information.

Figure 3:
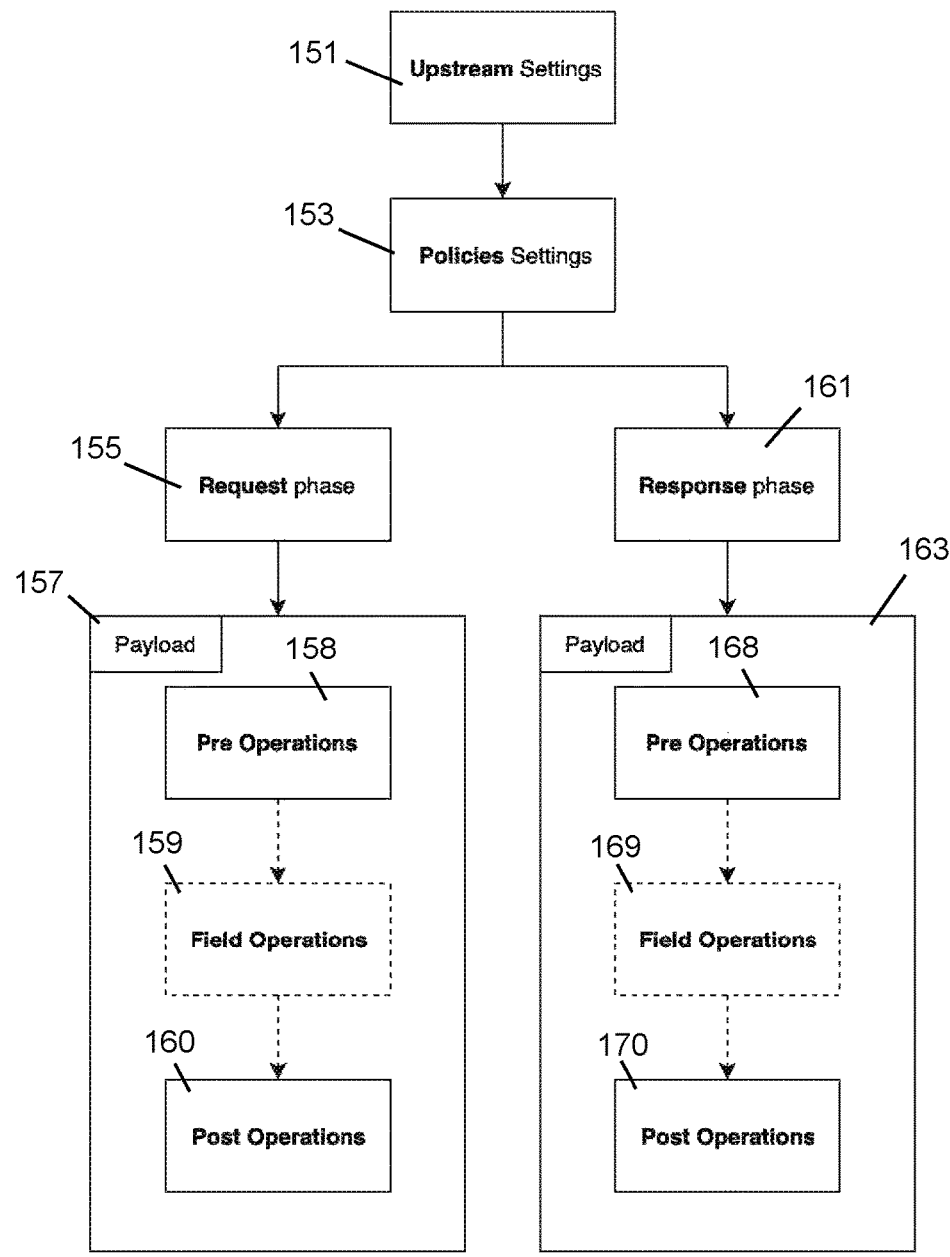
FIG. 3 illustrates a flowchart of an embodiment of a data payload processing.

With reference to FIG. 3, an example of a basic operation workflow diagram for the system is illustrated. The system can have upstream settings 151 and policies settings 153 that are used to control the system processing of the data flowing through the system. An example of Operation Pipeline is illustrated showing an ordered set of operations that can be performed on a data payload to selectively handle any specific data elements within a data payload, according to a preconfigured policy. The illustrated Operations Actions may be taken on a data payload or some subsection of a data payload. Operation Actions can be split into three categories: pre operations, field operations, and post operations to simplify construction of sets of Operations Actions as well as preserve the integrity and auditability of any ordered set of actions applied to data payloads. Pre operations encompass any actions required prior to the data payload being specifically operated on. Most often pre operations entail identifying and selecting the specific portions of the payload to be processed, but they may also involve preliminary authentication, data transformation, or cleaning. Cleaning can include for example, dropping of extraneous portions of the payload or conversion of the payload into a normalized data type). Field operations can be the specific actions intended to be applied to specific portions of a data payload. Field operations can normally include: redact, reveal, secure, or enrich specific portions of the payload identified via pre operations. Post operations can denote operations that must occur after field operations. Usually post operations consist of ordered recombining of specific portions of the data payload processed in the field operations to construct a clean, well-formed data payload with the requisite policies applied. This Operations Pipeline decomposes data processing into clear steps (Operations Actions) that enable construction of clear programmatic workflow for handling sensitive data through the system. This Operations Pipeline also enables efficient debugging, repeat/replay of operations, auditing or reconciling to ensure the integrity of any operation or set of operations. For example, when data is received during the request phase 155, the system can receive the data payload 157 and the system can perform: pre operations 158, fields operations 159, and post operations 160. Similarly, when data is received during the response phase 161, the system can receive the data payload 163 and the system can also perform: pre operations 168, fields operations 169, and post operations 170. The pre operations 158, 168 include the system's identification of elements in the data payload that the system is configured to operate on. The field operations 159, 169 can be the operation pipeline's conducting the desired action(s) on the data payloads. The post operations 160, 0170 can include the rolling up and combining of data prior to transmitting the data payload 157, 163 from the system. FIG. 3 can illustrate a single operation on the request data payload 157 and the response data payload 163. In other embodiments, a chain or sequence of operation acts can be performed on data payloads since the output of any operation (pre operation, field operation, and post operation) within the system's operation pipeline may be utilized as input for the next set of operations.

Figure 4:
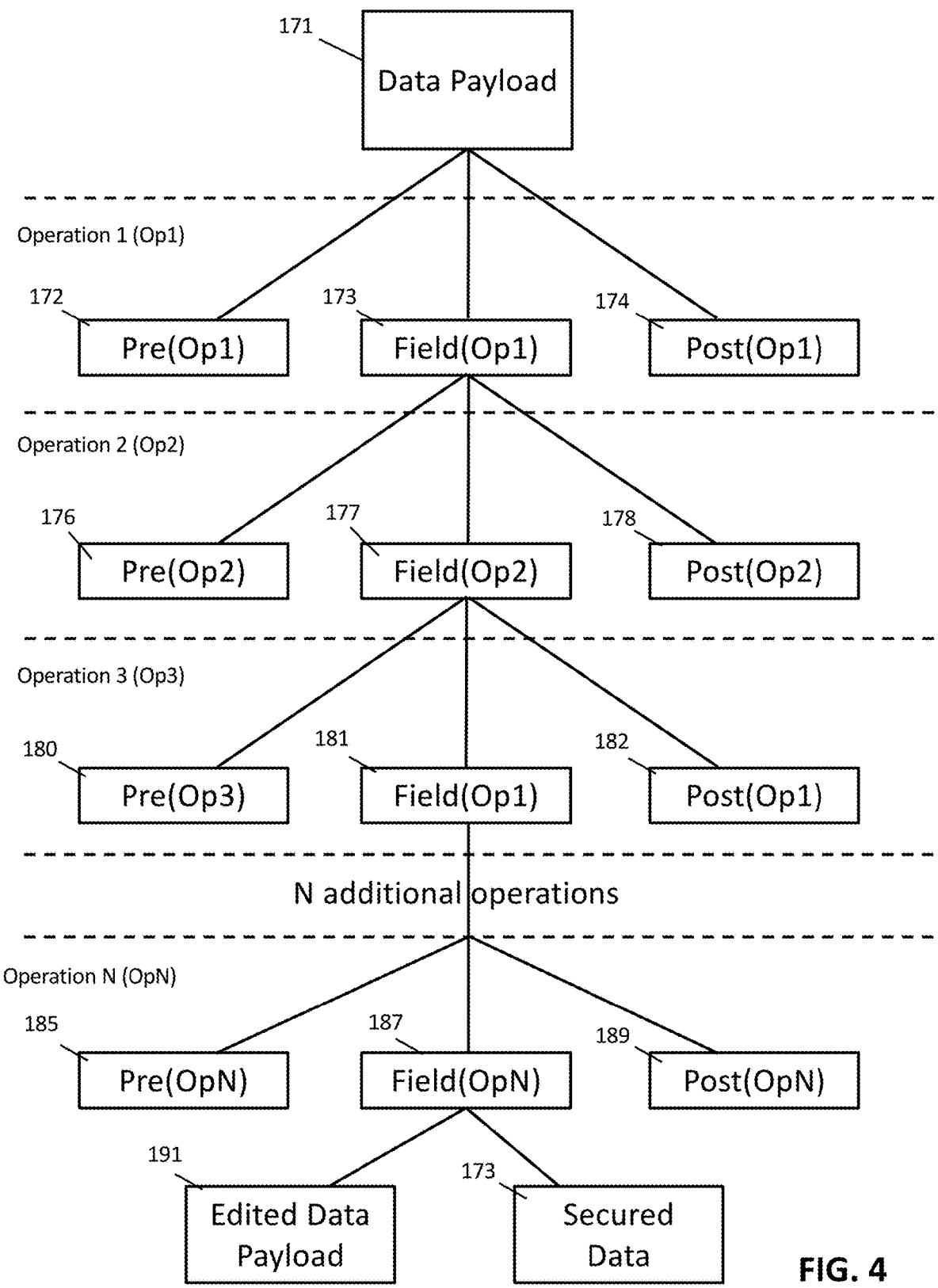
FIG. 4 illustrates a flowchart of an embodiment of a data payload processing with multiple operations.

As illustrated in FIG. 3 for each operation there are pre operations 158, 168, field operations 159, 169, and post operations 160, 170 for the data payloads 157, 163 which can be various file types including JSON, PDF, CSV, etc. With reference to FIG. 4, a flow chart of data processing is illustrated that includes multiple operations. This is a more detailed view of the Operation Pipeline component (139 in FIG. 2) and describes how the data payloads 171 are parsed and processed by the system to ensure that sensitive specified elements and element types data are properly secured and operated on. The Operation Pipeline can include any number of specific ordered operations. In the illustrated embodiment, there are specific operations 1, 2, 3 and N operations. The first process can be operation 1 (OP1) which can include a pre operation Pre(Op1) 172, fields operations Field (Op1) 173, and post operations Post(Op1) 174. The second process can be operation 2 (OP2) which can include a pre operation Pre(Op2) 176, fields operations Field (Op1) 177, and post operations Post(Op1) 178. The third process can be operation 3 (OP3) which can include a pre operation Pre(Op3) 180, fields operations Field (Op3) 181, and post operations Post(Op3) 182. The Nth process can be operation N (OpN) which can include a pre operation Pre(OpN) 185, fields operations Field (OpN) 187, and post operations Post(OpN) 189. The processed data can be transmitted from the system as edited data payloads 191 and/or secured data 173.

In an exemplary embodiment, the first operation can be tokenization of all credit card numbers in a payload as specified by a first applied policy setting. The pre operation Pre(Op1) 172 can be to identify all credit card numbers, the field operation Field(Op1) 173 can be to separately tokenize each credit card number in the payload. The post operation Post(Op1) 174 can be to roll up and recombine all tokens with the data payload for the next operation.

The second Operation 2 (Op2) can be the tokenization of all CVV numbers for the credit cards in the payload with a time bound format as specified by a second applied policy setting. For example, the CVV tokenization can have a time bound format of a few minutes, after which the CVV token is no longer valid. In an embodiment, the time limitation can be 5 minutes. The pre operation Pre(Op2) 176 can be the identification of the CVV, the field operation Field(Op2) 177 can be the separate tokenization of each CVV in the data payload and the post operation Post(Op2) 178 can be the rollup and recombination of all tokens with the data payload prior to the next operation.

The third operation 3 (Op3) can be the enrichment of the name data with risk ratings. The pre operation Pre(Op3) 180 can be to identify all name elements within the payload. The field operation Field(Op3) 181 can be to add a nested element indicating a risk score as specified by a third applied policy setting. The risk scores for each name can be obtained from a $3^{rd}$ party service or internal risk algorithm.

The post operation Post(Op3) 182 can be the rolling up and recombination of all name elements with nested risk scores with the data payloads prior to a subsequent operation. Various other operations (N additional operations) can then be performed. The Nth operation (OpN), can redact date of birth (DOB) information from the data payload. The pre operation Pre(OpN) 185 can be the identification of all DOB elements within the data payload, the field operation Field (OpN) 187 can be to remove all DOB information and replace all DOB information with null information as specified by a nth applied policy setting. The post operation Post(OpN) 189 can be to rollup and recombine all redacted elements with the data payload.

When the last operation is performed, the system can transmit egress data which can be edited data payloads 191 which no long include sensitive information to the customer system or data destination. The system can securely ingress sensitive data, secured data 173 to the system servers and securely store it within a vault.

The system operation types on the data payloads can include: redaction which can be the removal of elements in the data payload, storage which can be the storage of encryption and vault elements and return non-sensitive placeholders, revealing which can take non-sensitive placeholders and replace the placeholders with previously stored elements, processing can be the accepting of inputs and operations performed on the payloads based on the inputs, enrichment which can include appending or editing the payloads with other information, and routing which can include forwarding payloads onward with or without operating on the payload data.

Figure 5:
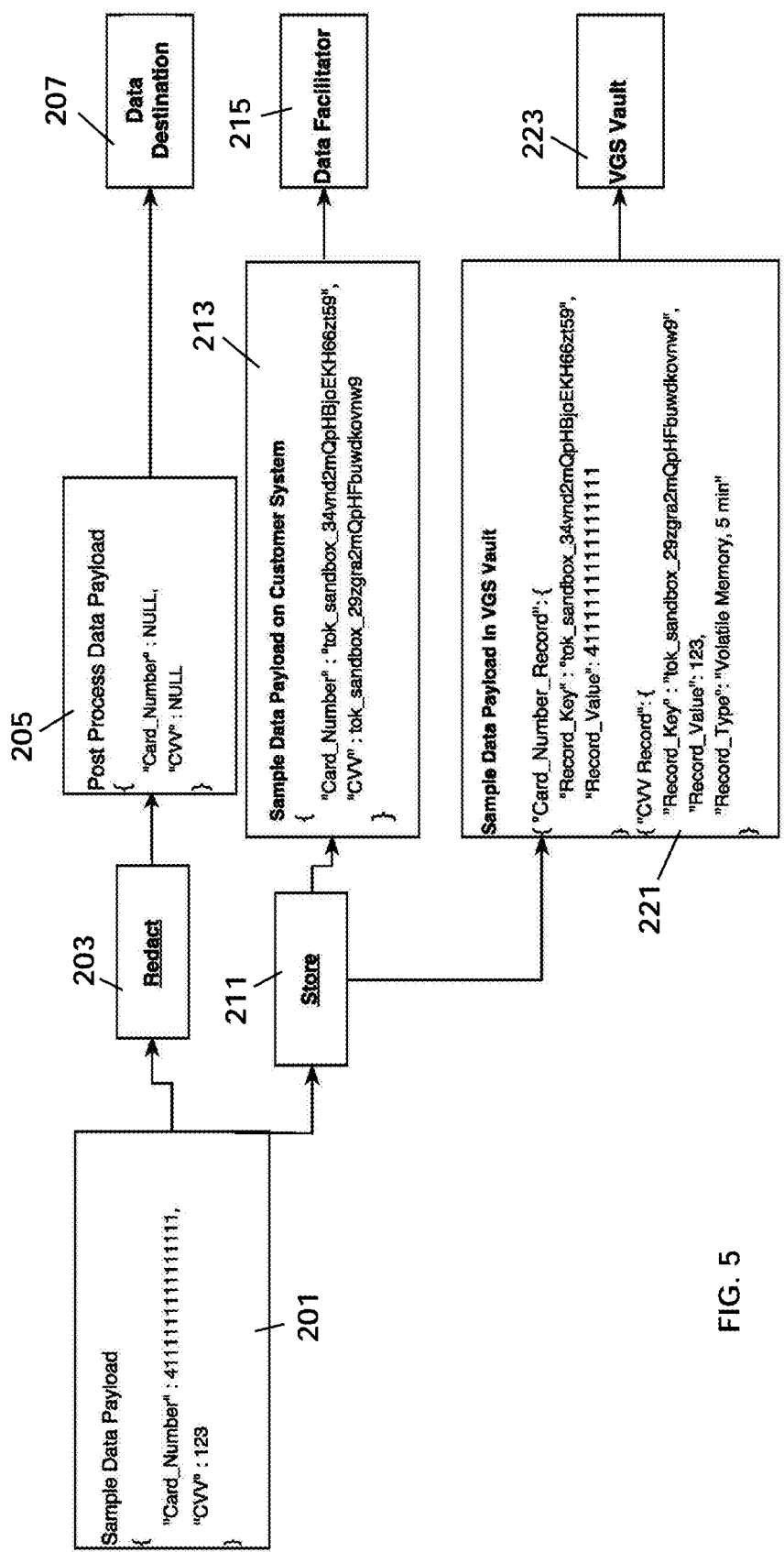
FIG. 5 illustrates a flowchart of an embodiment of a data payload processing for multiple data destinations.

With reference to FIG. 5, a flow chart illustrates operations performed on a sample payload which can include: 1. Redaction to remove elements, 2. Storage which can encrypted data and vault elements and return non-sensitive placeholders such as tokens, 3. Reveal data by converting the non-sensitive placeholders and replacing the placeholders with previously stored data elements, 4. Process which can accept input data and operate on the data payloads based upon the input data fields, and 5. Route which can forward payload data onward with or without operating on the data. In the illustrated example, a sample data payload 201 can include a "Card_Number": 4111111111111111 and a "CVV": 123. If the field operation is redaction 203, the field operation 205 can be to replace the credit card number and CVV with NULL data and the edited data payload 201 is then forwarded to the data destination 207. In an embodiment, the data payload 201 can be forwarded to a store credit card processing system 211. The system can replace the credit card number "Card_Number" with a CC number Token and the CVV number is replaced with a CVV token 213. Once the credit card number and CVV numbers are replaced with tokens, this revised data payload is forwarded to the data facilitator 215.

Figure 6:
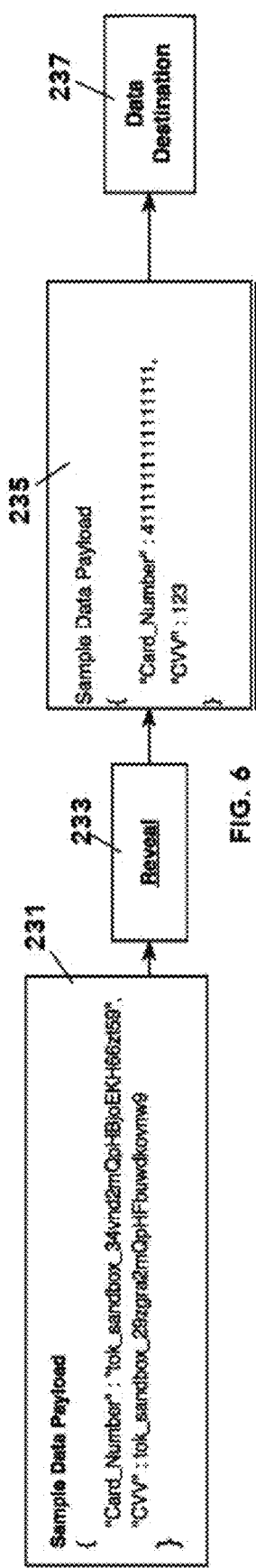
FIG. 6 illustrates a flowchart of an embodiment of a data payload processing for credit card information.

In an embodiment, the data payload 201 can be forwarded to a credit card processing system 211. The system can replace the credit card number "Card_Number" with a CC number Token and the CVV number is replaced with a CVV token 213 as specified by the applied policy settings. Once the credit card number and CVV numbers are replaced with tokens, this revised data payload is forwarded to the data facilitator 215. In an embodiment, customer payment card data can be transmitted to a vault storage device 223. The credit card information and CVV in vault storage can be later inserted into the data payload when the data is sent back from the system. For example, with reference to FIG. 6, the sample data payload 231 has tokens for the credit card number and the CVV. The system can perform a reveal 233 process where the original data can replace the detected tokens in the payload 235 with the actual data that had been previously been replaced by the tokens. The revised data payload can then be transmitted to the data destination 237.

Figure 7:
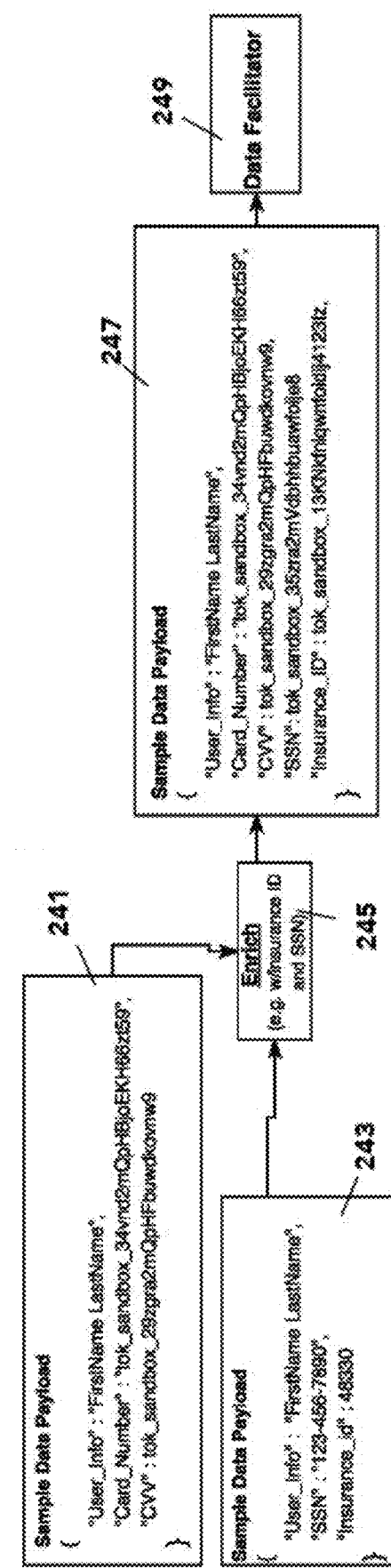
FIG. 7 illustrates a flowchart of an embodiment of a data payload combination and tokenization for credit card, social security, and insurance information.

With reference to FIG. 7, multiple data payloads can be combined and specific data can be tokenized. In this example, the first data payload 241 can include: user first and last names, a credit card token representing the user's credit card number and a CVV token representing the user's CVV number. The second data payload 243 can include the users first and last name, the social security number and the insurance number. The system can enrich 245 the first data payload 241 by adding the insurance ID and social security number from the second data payload 243 as specified by the applied policy settings. The first payload 241 and the second payload 243 can be matched based upon the user information, which can be the name. The system can provide tokens for the social security number and the insurance ID. The resulting enriched data payload 247 can include the user name, the credit card token from the first data payload, the CVV token from the first data payload and an SSN (social security number) token and an insurance ID token from the SSN and insurance ID from the second data payload. In this example, the tokenized payload 247 can be transmitted to a data facilitator 249.

Figure 8:
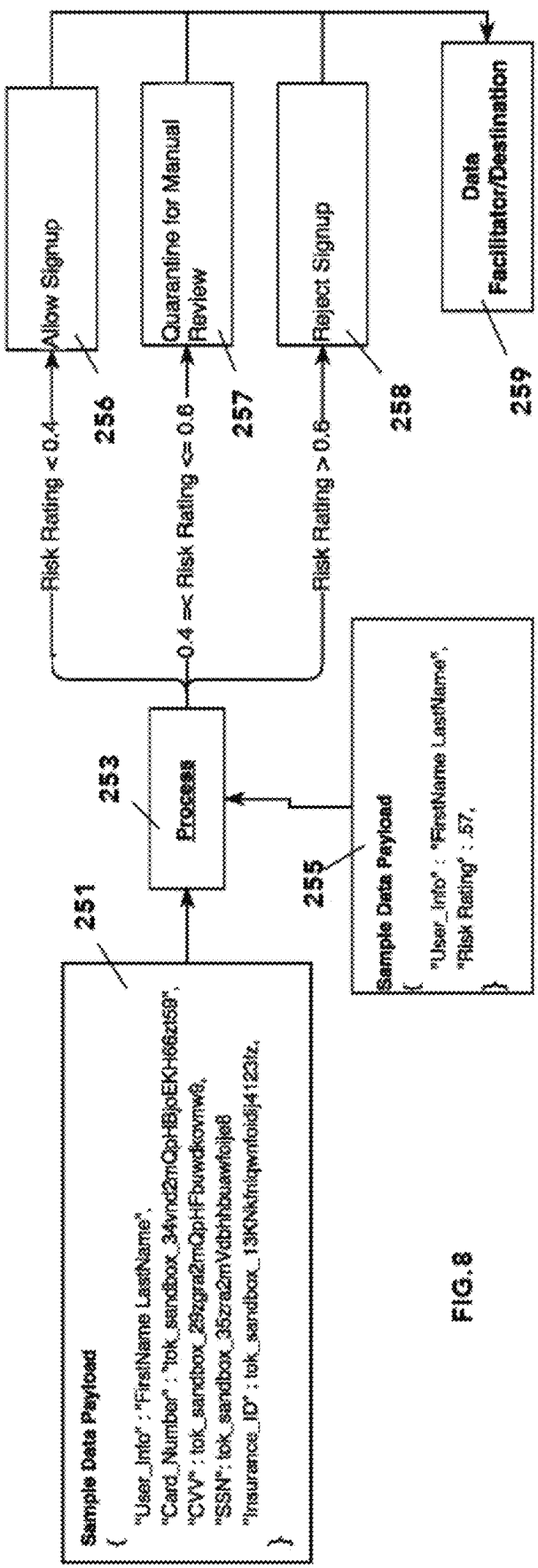
FIG. 8 illustrates a flowchart of an embodiment of automated data payload processing based upon risk ratings.

With reference to FIG. 8, the system can process or automate decision-making based on a data payload or combination of data payloads. In this example, the system can receive a first payload 251, which includes a user info: name and tokens for credit card, CVV and SSN. The second payload 255 can include a user info: name and a risk rating. In this example, the risk rating is 0.57. The policy controlling the field operation can be configured to allow users having a risk rating lower than 0.4 to use the card information to conduct a transaction 256, quarantine payments for users who have a risk rating between 0.4 and 0.6 for manual review and reject transactions from users who have risk ratings higher than 0.6. In this example, the system will require manual review of the user based upon the risk ratings between 0.4 and 0.6. If the user is accepted by the manual review, the user data can be forwarded to the data facilitator/destination to complete a transaction 259.

Figure 9:
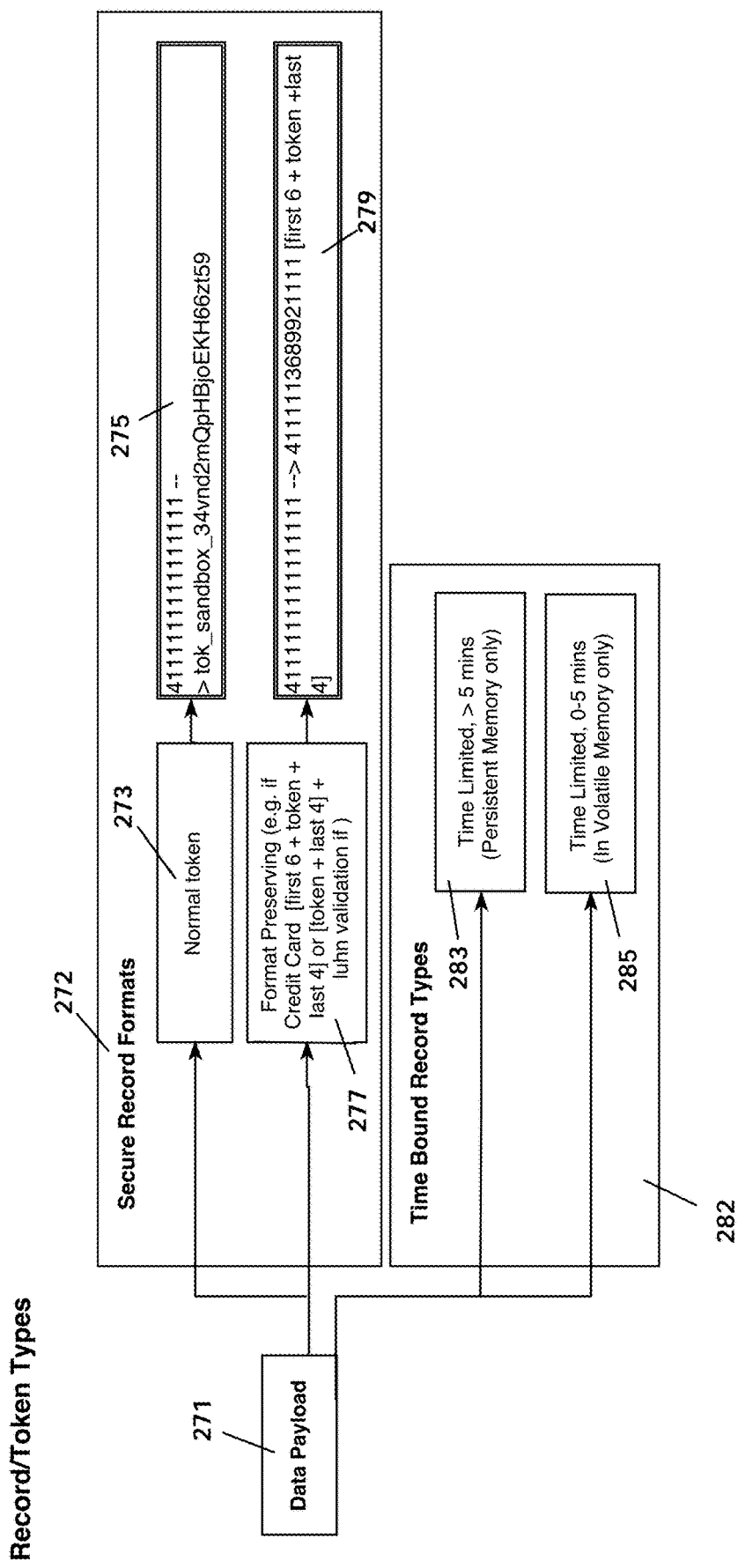
FIG. 9 illustrates a flowchart of an embodiment of tokenization of the data payloads based upon policies applied to the field operation.

As illustrated in FIG. 9, the system can be used to perform tokenization of the data payloads 271 based upon the policy applied to the field operation. The system can perform various types tokenization on the data payloads. The system can perform secure record creation 272 with a normal token format 273. For example, data payload can be 41111111111, which can be converted into a completely unrelated token 275. However, the system can also be utilized to create a number of other secure record formats. In this type of example, the field operation can have a policy, which can convert the data payload into a format preserving schema 277. For example, if a credit card number is being tokenized, the first 6 digits can match the first 6 digits of the credit card number, a token can be placed in the middle of the number and the last 4 digits of the credit card number can be placed at the end of the tokenized number 279 and, optionally, Luhn validation or some other class of validator maybe applied. Luhn validation is also known as the "modulus 10" or "mod 10" algorithm, is a simple checksum formula used to validate a variety of identification numbers, such as credit card numbers, IMEI numbers, National Provider Identifier numbers in the United States, Canadian Social Insurance Numbers, Israel ID Numbers and Greek Social Security Numbers (AMKA). Alternatively, a credit card number may be tokenized so that a token replaces all but the last 4 digits of the credit card number. In other embodiments, the tokenization can add a first plurality of digits and/or characters before the data payload and then a second plurality of digits and/or characters after the data payload so that the original data format of the data payload is preserved or so the original data is secured by a token that retains some of the original data's usability.

The field operation can also create time bound record types 282. For example, the system may apply a time limit of greater than 5 minutes for data stored in persistent memory 283 to more closely tailor availability/exposure of tokens to the amount of time a valid business justification exists for the tokens' usage. One example of this would be if a $3^{rd}$ party auditor required viewing of specific records to spot check for an audit that lasts three weeks, or if a customer only wants to allow utilization of a tokenized credit card to make payments for over the course of a week, day, or other pre specified period of time. Alternatively, the time limit for record usability can be 0-5 minutes 285 and may be further secured by being stored in volatile memory. Five minutes can be sufficient time to perform the necessary processing but since the data is only stored for less than 5 minutes, the data is less likely to be hacked, leaked, or otherwise unintentionally exposed or misused.

Figure 10:
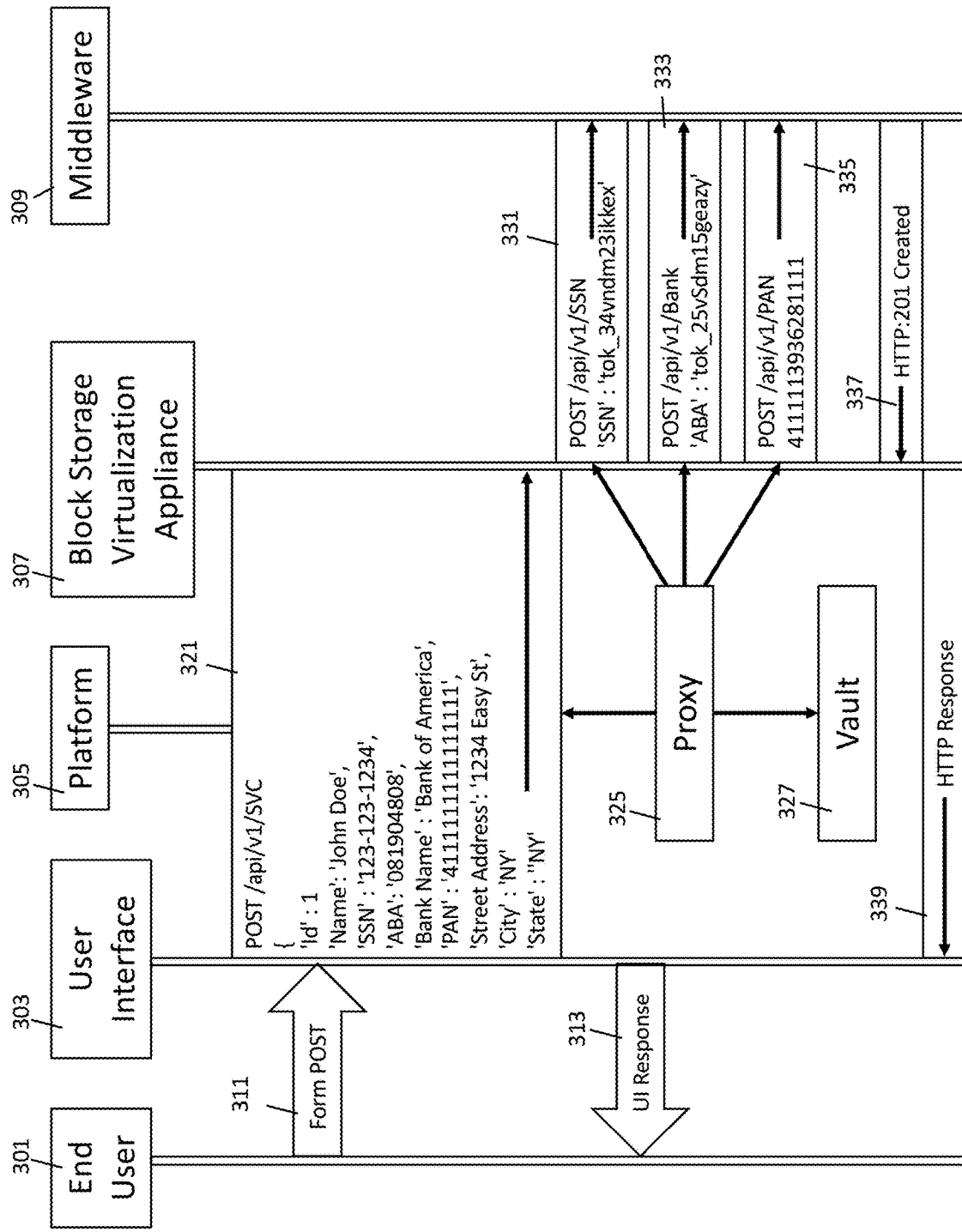
FIG. 10 illustrates a diagram of an embodiment of data payload processing based upon policies applied to the field operation.

In different embodiments, the inventive system can be used with various nTier applications to conduct selective multi-field, sensitive data reduction. With reference to FIG. 10, a diagram showing specific elements secured is illustrated. The system can include an end user 301 who can access the system through a web browser such as Google Chrome. The App may have a front end 303 provided by a markup language such as an HTML standard such as HTML5 that presents content to the Internet. The system 305 can be positioned between the app front end 303 and a $3^{rd}$ party SAN volume controller (SVC) 307. The $3^{rd}$ party SVC(s) 307 can sit between hosts and storage arrays. Data can be transmitted between the inventive system 305 and app middleware 309 through the $3^{rd}$ party SVC(s) 307 thereby segmenting app middleware from specific parts of the data payload.

In an embodiment the end user 301 can provide a form POST 311 to the app front end 303. In this example, the user input POST/api/v1/SVC 321 can include: a user identification Id 1, Name John Doe, SSN 123-123-1234, ABA 081904808, Bank Name Bank of America, PAN 4111111111111, Street Address 1234 Easy St., City NY and State NY. The system 305 proxy 325 can intercept the API Call and perform a data transformation on sensitive fields such as SSN, ABA, etc. The system 305 can store the original values for sensitive information in a vault storage system 327 so that the sensitive information can be retrieved for future reveal operations. The system 305 can provide an SSN token, POST/api/v1/SSN 331, an ABA (bank account number) token POST/api/v1/Bank 333, and a PAN token POST/api/v1/PAN 335. The App middleware 309 can perform processing on the data transmitted from the system 305 and in response to the data, the App middleware 309 can create a response HTTP:201 Created 337 which is transmitted back to the system 305 through the $3^{rd}$ party SVC(s) 307.

The system 305 can then transmit the HTTP Response 339 which can be transmitted through the App front end 303 to the end user 301. This system 305 securely logs data traffic and access. The system 305 also prevents the SSN, ABA and PAN from being transmitted to the App Middleware 309 to provide security for the end user's SSN, ABA and PAN and reduce the scope of compliance required by the App middleware owner.

Figure 11:
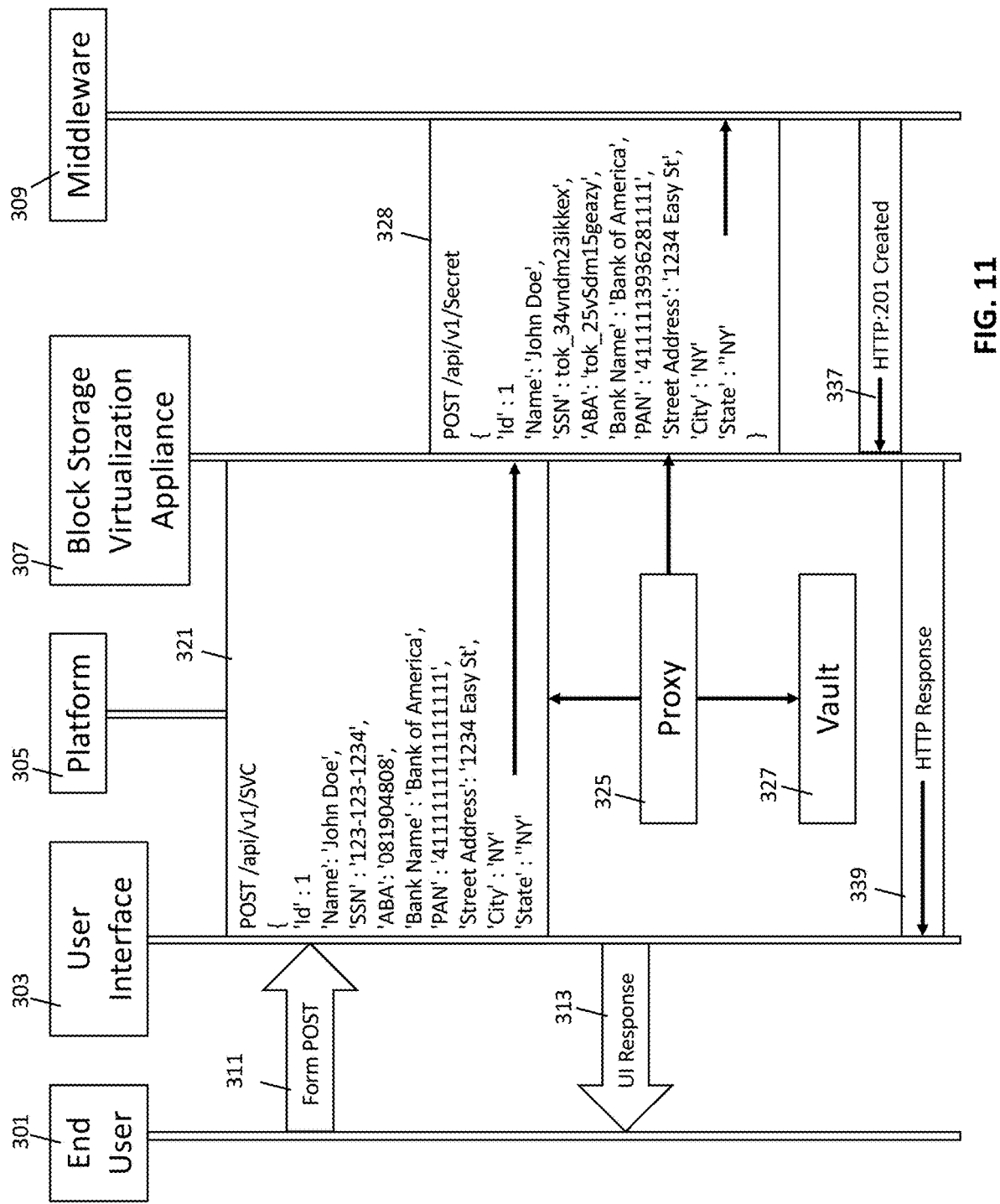
FIGS. 11 and 12 illustrate diagrams of embodiments of personal data processing based upon policies applied to the field operation.

FIG. 11 is similar to FIG. 10 but the system 305 rewrites the payload rather than individually transmitting tokens for the SSN, ABA and PAN. In the illustrated embodiment the end user 301 can provide a form POST 311 to the app front end 303. In this example, the user input POST/api/vl/SVC 321 can include: a user identification Id 1, Name John Doe, SSN 123-123-1234, ABA 081904808, Bank Name Bank of America, PAN 4111111111111, Street Address 1234 Easy St., City NY and State NY. The system 305 proxy 325 can intercept the API Call and perform a data Transformation on Sensitive fields such as SSN, ABA, etc. The system 305 can store the original values for sensitive information in a vault storage system 327 so that the sensitive information can be retrieved for future reveal operations. The system 305 can rewrite the data payload POST/api/vl/Secret 328 with a SSN token, an ABA token, and a PAN token. The rewritten data payload POST/api/vl/Secret 328 can be transmitted to the App middleware 309. The App middleware 309 can process the rewritten data payload 328 transmitted from the system 305 and in response to the data payload 328, the App middleware 309 can create a response HTTP:201 Created 337 which is transmitted back to the system 305 through the $3^{rd}$ party SVC(s) 307. The system 305 can then transmit the HTTP Response 339 which can be transmitted through the App front end 303 as a UI response 313 to the end user 301. This system 305 securely logs data traffic and access. The system 305 also prevents the SSN, ABA and PAN from being transmitted to the App Middleware 309 to provide security for the end user's SSN, ABA and PAN and reduce the scope of compliance required by the App middleware owner.

Figure 12:
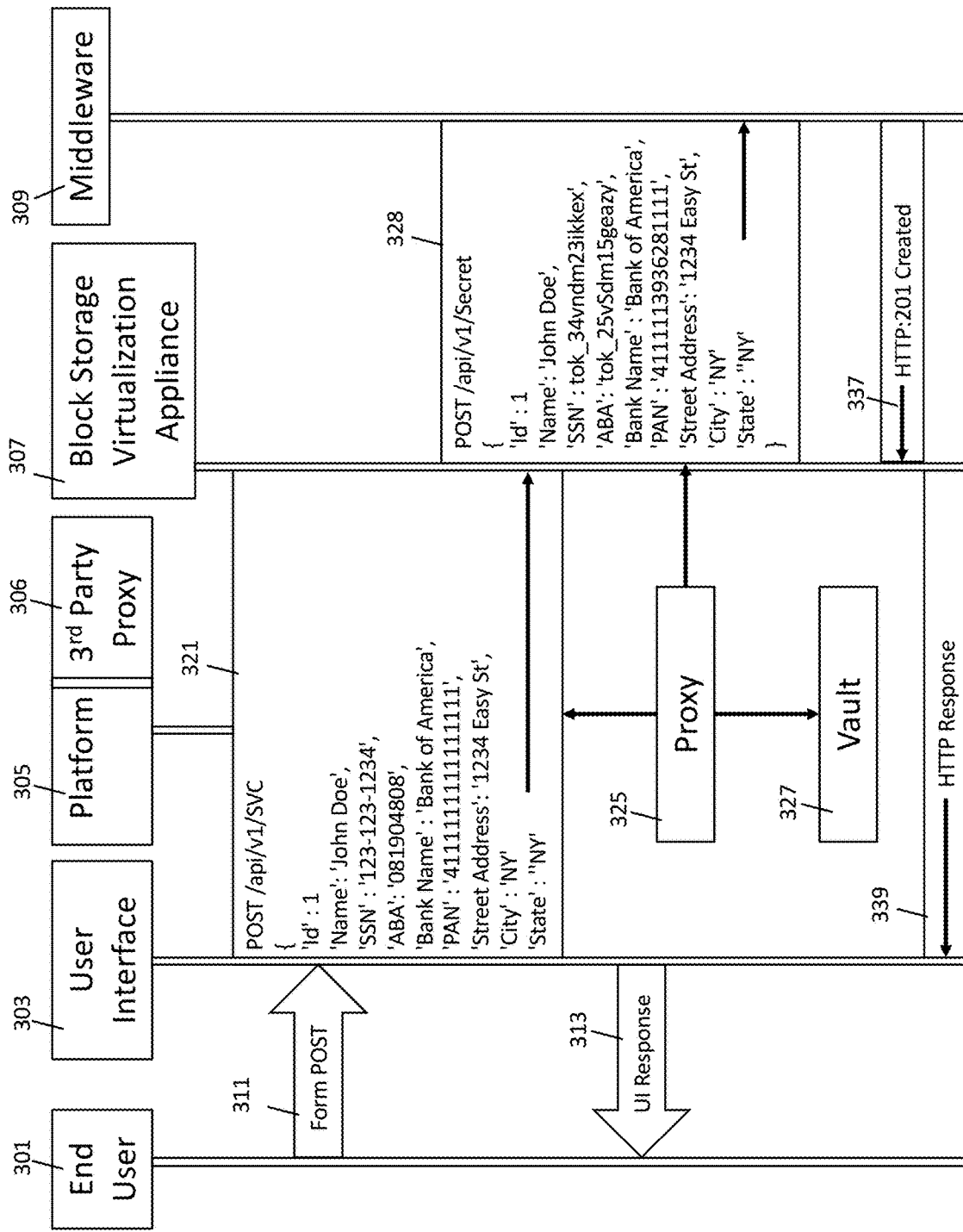

FIG. 12 illustrates a diagram showing specific elements secured is illustrated. The system can include an end user 301 who can access the system through a web browser. The App may have a front end 303 provided by a markup language such as an HTML standard such as HTML5 that presents content to the Internet. The system platform 305 can function as a $3^{rd}$ party proxy 306 between the app front end 303 and a $3^{rd}$ party SAN volume controller (SVC) 307. The $3^{rd}$ party SVC(s) 307 can sit between hosts and storage arrays. Data can be transmitted between the inventive system 305 and App middleware 309 through the $3^{rd}$ party SVC(s) 307.

In an embodiment the end user 301 can provide a form POST 311 to the app front end 303. In this example, the user input POST/api/vl/SVC 321 can include: a user identification Id 1, Name John Doe, SSN 123-123-1234, ABA 081904808, Bank Name Bank of America, PAN 4111111111111, Street Address 1234 Easy St., City NY and State NY. The system 305 proxy can intercept the Rest API Call "POST/api/vl/SVC" and perform a data Transformation on Sensitive fields 325. The system 305 can store the original values for sensitive information in a vault storage system 327 so that the sensitive information can be retrieved for future reveal operations. The system 305 can provide a Rests API Call "POST/api/vl/Secret" with the SSN, ABA and PAN replaced with a SSN token, an ABA token an d a PAN token respectively. The App middleware 309 can perform processing on the data transmitted from the system 305 and in response to the data, the App middleware 309 can create a response HTTP:201 Created 337 which is transmitted back to the system 305 through the $3^{rd}$ party SVC(s) 307. The system 305 can then transmit the HTTP Response 339 which can be transmitted through the App front end 303 as a UI response 313 to the end user 301. This system 305 securely logs data traffic and access. The system 305 also prevents the SSN, ABA and PAN from being transmitted to the App Middleware 309 to provide security for the end user's SSN, ABA and PAN and reduce the scope of compliance required by the App middleware owner.

Figure 13:
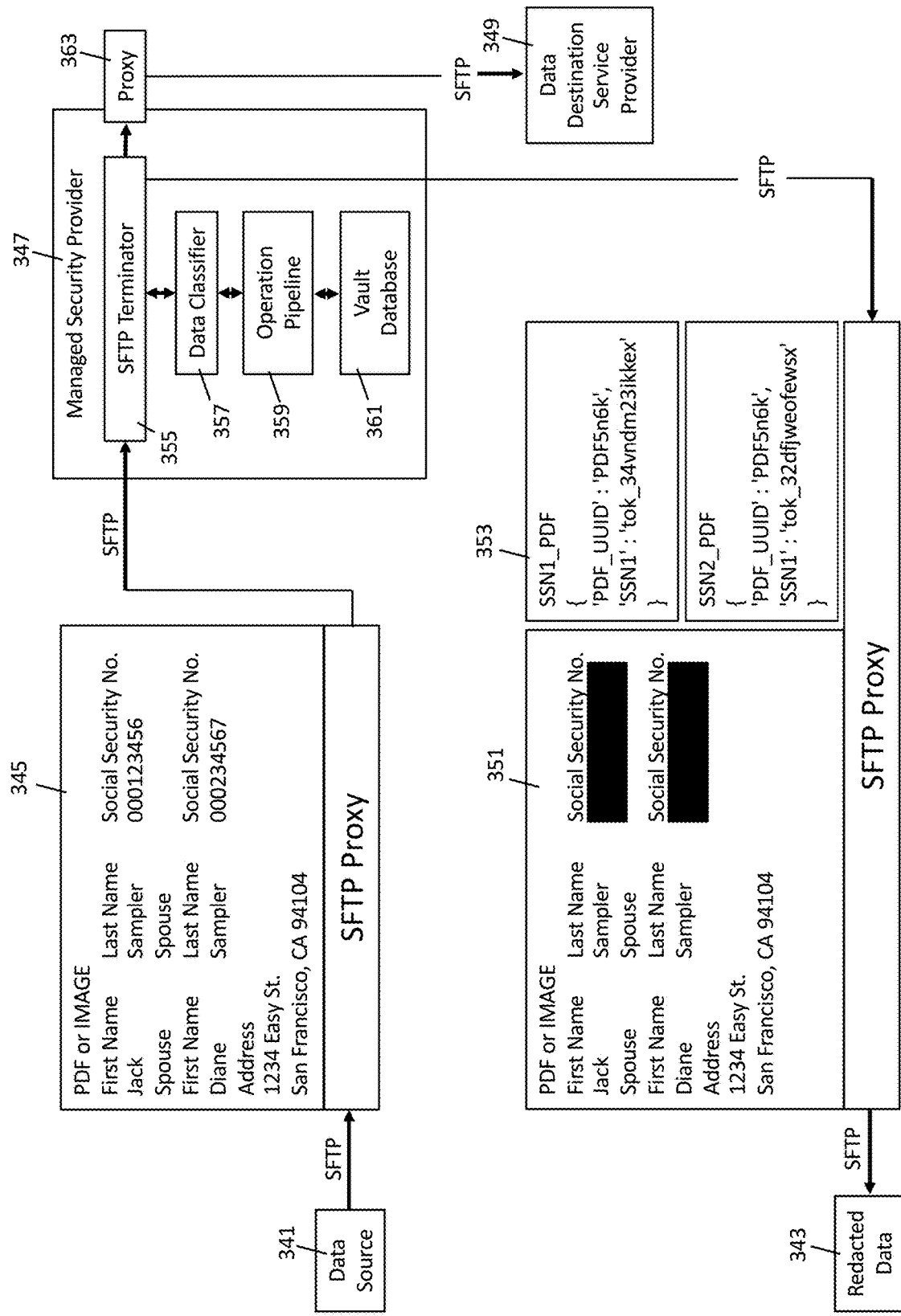
FIG. 13 illustrates a diagram of an embodiment of income tax data processing based upon policies applied to the field operation.

With reference to FIG. 13, the inventive system, acting as a managed security provider 347 can be used to secure other types of documents such as digital images (images) and portable document format (PDFs) 341. The document can be transmitted by SSH File Transfer Protocol (SFTP) to the system 347 which can include a SFTP terminator 355, a data classifier 357, operation pipeline 359 and a vault secure storage database 361 which function as described above with reference to FIG. 2. In the illustrated example, a 1040 tax return PDF or image document 345 includes SSNs. The managed security provider system 347 can receive the PDF or image document and a SFTP terminator 355 can cause the PDF or image to be processed by a data classifier 357, an operation pipeline 359, and a vault secure storage database 361. The processing can perform redaction of areas of the PDF or image document that include sensitive information. The information in the redacted areas can be encoded with the redacted data and encrypted into surrogate records (tokens). In an embodiment, the original PDF or image document can be forwarded to a trusted third party trusted service provider, which can be a data destination service provider 349. The data payload 347 with redacted PDF or image records and accompanying surrogate records 353 can be transmitted under SFTP 351 to a $3^{rd}$ party application owned by a data facilitator 343. In the illustrated example, the SSNs have been redacted from the processed tax document 351. The accompanying records include tokens for the social security numbers along with document identification information. In this example, the accompanying information is SSN 1 and SSN 2. The PDF UUID is "PDF5n6k". The SSN1 token is "tok_34vndm23ikkex" and the SSN2 is "tok_32dfjweofewsx".

The 3rd party application 343 can receive the redacted PDF and/or Image documents 351 and accompanying surrogate records 353 which can be sent to a data facilitator for storage and future operations. The accompanying records 353 and the redacted PDF and/or Image documents 351 can be used to instruct the managed security provider 347 to selectively decrypt and send the PDF and/or image documents to the $3^{rd}$ party application 343.

The system can perform various Tokenization Strategies with different Formats and representations of sensitive data in the data payloads. The tokens can be non-sensitive placeholders for encrypted data. The system can also provide a Data sharing platform: based on policies set by data facilitators, allows other data facilitators to interface with data secured by the system. Also authenticated applications built on top of the Platform can be allowed to operate on data secured by the inventive token system.

System Definitions

System Components of a System Platform Computer Server. In an embodiment, the system can be used as a Network Proxy or a Middlebox. The system computer server can function as a network data tunnel type mechanism which can perform tasks including, but not limited to the following types of functional tools: reverse proxy and customer data facilitator usage. In a Reverse Proxy configuration, the system server can sit in front of an upstream Data Source and is a computer system and the system server can redact, reveal, and enrich data in data payloads as they passes through the system server.

In a Customer (Data Facilitator) system configuration, the reverse proxy system server can be in front of a Customer's own API and act as a back-end service for API clients. One typical usage of the system server is to allow the collection and securing of sensitive data (clients, customers, financial institutions, and others) before sending data payloads to Customer API. Another is to take a response data payload initiated by Customer's API containing a token from the inventive system platform and replacing/revealing the token and routing the response data payloads on to third parties as needed for Customers' business.

In different embodiments, the inventive system can be used for various applications. In a reverse proxy configuration, the system server can be used to receive the payment information from a customer. The customer computing device could send the payment information via a secure form or JavaScript through the inventive system server in a reverse proxy configuration. In transit, the reverse proxy server configuration, the data classifier and operation pipeline can redirect the sensitive payment instrument information in data payloads to a secure inventive system vault database and the vault database sends a corresponding token in place of the payment instrument information in data payloads to a business' back-end servers, and the vault returns a response to the client/service used to collect the payment information from customers.

In a Forward Proxy configuration, the system server sits in the stream of traffic from a data stream or network and the Forward Proxy server redacts, reveals, and enriches data in data payloads passes through the system server. The Forward Proxy configuration can provide customer (Data Facilitator) usage. The forward proxy is used by server software to send requests to the third-party server services. The forward proxy's typical usage can reveal the request data to the third-party server services or redact the third-party service responses without involving non-system infrastructure and keeping those systems out of scope of the sensitive data compliances.

In a subscription billing model example, the inventive system can use a token that represents the customer's payment information in a back-end system to charge that customer's payment information. In this embodiment, the inventive system would send a payload to debit the customer with that token through the system forward proxy. In transit, the forward proxy would replace a token with the customer's sensitive payment information and forward that payload to an end-payment processor so that the payment processor could charge the customer and the forward proxy system can return a response to the client/service used to collect your customer's information. The inventive system can utilize Transports/Transport type Protocol: TCP Based, Layer 7 protocol.

In different embodiments, the inventive system can include a dashboard which can be a user interface where Data Facilitators can provision users, set Policies, and review activity. The system can include an Application Program Interface (API) and the internal system API can be utilized to configure policy so that the Data Classifier can handle data payloads according to specifications within said policies.

Data Classifier or the Rules Engine/Policy engine can be a software module running on the system server which can provide a mechanism for tooling to enforce policy on data based on classification, provider, recipient or some other combination of payload characteristic. The data classifier can receive data payloads and analyze the contents of the data payloads to decides if a specific Operation pipeline should be applied to the data payloads.

The data classifier can store a set of Policies which are a set of conditions that define when data in the data payloads should be operated on as it passes through a proxy. When the conditions are evaluated to true, then the data classifier can divert the data payloads to a set of operation pipeline processes that are executed according to the phase which can be a request phase, a response phase, or other phase.

The Operation Pipeline can be an ordered set of software operations that the system server can perform on the data payload to handle data according to preconfigured policies. The operations in the operation pipeline can be actions that may be taken on a data payload or some subsection of a data payload by the system server. The system server can perform software operations which can be generally classified as security or storage operations. Security Operations can be a class of operation that handles rule enforcement, redaction, revealing, enrichment, and other transactional token interactions. Storage Operations can be a class of operation that involves/impacts the creation or storage of data through the system platform The system Vault database can be a hardened infrastructure and database used to securely store data.

Tokenization Strategies performed by the system server can provide formatting and/or token representations of non-sensitive placeholders for encrypted data.

Data Sharing Platforms supported by the system server can be based on policies set by a Data Facilitator software module on the system server which allows other Data Facilitators to interface with data secured by the System Platform. The Data Facilitator software module also allows authenticated applications to be built on top of the system Platform to operate on data secured by the System Platform.

Stakeholder Component Definitions and Actions

Data Destination: A data destination computing device that receives request data payloads from the system server platform. The data destination computing device can optionally provide response data payloads back to the system server platform.

Data Source: A data source computing device that sends data request payloads to the system server. The data source computing device can optionally receive response data payloads from the system server.

Ingress is data payloads entering the system server platform.

Egress is data payloads that leaving the system server platform.

Request is a data payload made to the system server platform or routed through the system server platform to other system components. Response is a data payload sent by the system server in response to a request made to the system server or passed along to other system components by the system platform.

Stakeholder Types

Data source computing devices provide requests to the system server platform and can optionally receive responses from the system server platform. An example would be a credit card holder providing their credit card information to one of our customers through our platform.

Data destinations computing devices receive a request routed by system server platform and the data destinations computing devices can optionally provide responses to the requests which are transmitted back to the system server platform. For example, a payment processor system computing device could route card data payloads with a payment instruction to the processor through the system server and the payment processor system computing device can receive a response confirming purchase from the system server platform.

Data Facilitator is a computing entity utilizing the system server platform to request data, perform operations on the data payloads (e.g. redact, encrypt and store, enrich, reveal, etc.), route the processed data payloads, and handle response data payloads. These customer data facilitator computing devices can not only initiate requests, handle responses, and orchestrate operations and routing, but also set policies generally over the types of data ingressed or egressed through the system server platform.

The System Server Platform is a computer system operating as a managed security provider for data transmitted through the system network. The system server platform can consist of some or all of the following components: a forward network proxy, a data classifier, a reverse proxy, a Customer API, a dashboard, an operation pipeline and a vault. Data payload ingress can be a request that is received through the first network proxy to the data classifier. The data classifier can create and enforce policing on the data based on data characteristics such as: classification, provider, recipient or some other combination of payload characteristic. The data classifier can communicate with an Application Program Interface (API) which can communicate with a dashboard. A system user can interact with the dashboard, which can have a user interface to create and configure policies for the system which are transmitted through the API to the data classifier. The policies can describe a set of conditions that define when operations are applied to data in the data payloads as they pass through a forward proxy and a reverse proxy. This hardened computer network can encompass a proxy routing system along with a secure Key Value store (tokenization) enabling raw data to be replaced with encrypted, randomized, formatted, and functionally preserved tokens.

In an intercepting proxy, the system server can intercept computer data payload traffic from both incoming and outgoing communications from datacenters and/or webservers etc. The system can be configured to perform customized data processing. For example, the system server can be configured to identify field level sensitive data in the data payloads. The field level sensitive data can be customizable and defined by the system user or system service customer. When the system server intercepts data payloads, the specified sensitive data fields are identified and the operation pipeline software module(s) on the system server redact the specified sensitive data field information. The operation pipeline software module(s) can replace the specified sensitive data fields with encrypted data, randomized data, etc. The replacement data provided by the operation pipeline software module(s) can be formatted to match the format of the specified sensitive data field information. The replacement data provided by the operation pipeline software module(s) can be functionally preserved tokens which can provide redacted substituted values so that these replacement useful tokens are still operable on, but no longer include any raw sensitive data.

In some embodiments, the inventive system can allow normal business operation data processing to be on the redacted and/or substituted tokenization data provided by the system server platform. The operation pipeline software module(s) of the system server platform may also reverse the tokenization process by rehydrating sensitive data back to the data payloads. For example, the identified sensitive data which has been encrypted or redacted can be revealed. The operation pipeline software module(s) of the system server platform may replace tokens with the sensitive data for outgoing egress data payload traffic going to specific 3rd party computer devices or other destinations. The operation pipeline software module(s) of the system server platform may also enrich information in the data payloads.

The operation pipeline software module(s) of the inventive system server can provide secure input flow for computer network platforms to protect the data of the end users. In different embodiments, data input forms or templates can provide secure libraries to enable structured collection of user input. Thus, the data payloads containing data for all of the system users can stay the same, but specific fields identified by the customer which may contain sensitive and/or private information can be redacted in a uniform manner for all user record data payloads. These processed data payloads can be rehydrated, enriched, or revealed at later times by the operation pipeline software module(s) of the system server platform.

The system server platform can be controlled by system customers through a dashboard user interface. The customer can identify specific parts (data fields) of the data payloads that can or will contain sensitive information. Based upon these identified parts, customers can define upfront rules to completely sanitize their original systems. In some embodiments, this processing can provide data security compliance regimes and the system server security processing can make it very easy for users to comply with security requirements.

In other embodiments, the inventive system server can also further enhance data security for network data. The inventive system server can provide a highly configurable real-time inline system to safely, transparently, and securely interact with sensitive data and allow others to build applications/programs on top of. For example, the inventive system can be a SaaS based, Agentless Secure Proxy that can be used in combination with real-time centralized logging enabling real-time analytics and neural network type alerting and IDS features as well as CASB controls. The system can provide transparent integration, security, and logging, with minimal code change. The system provides a Data Centric approach that can enhance Defense in Depth approaches. The system uses policy driven data lineage enforcement. The security is provided at the transport level rather than code level integration. The system can incorporate dynamic rule creation and enforcement. The system has the ability to enrich traffic at the data/application layer level. The system provides, not only de-tokenization, but also adding data to specified routed/processed customer data. e.g. appending data to original information or response. For example, when submitting information to an end-point adding pre-specified additional data, to either the submission or to the resulting response (e.g. appending a risk score or approval response flag to a tokenized identity). The system can have a bi-directional configuration that is able to process endpoint responses in-line. The system can provide access control, granular read/write permissioning, alerting and audit logging on OSI layer 7 (Application Data). This can include compliance-as-a-service cloud architecture and chained compliance, both descoping customer systems/networks and enabling compliance audit economies of scale. E.g. One major audit can be utilized to review data across all related customers and customer integrations, subsequent smaller audits can utilize findings from this main audit to expedite review.

The system can provide Native Zero-Trust data-lifecycle, strong authentication, authorization, audit & control. The system can provide payload inspection and selective payload rewriting. The system can use Custom UUID tokenizing if necessary. The system has the ability to develop applications on top of the system to securely run/interface with data secured by the system. The system can perform custom data residency routing. The system can provide a secure environment for running custom code on sensitive data. The system can provide custom tokenization/key value schemes. The system can also provide elective automated routing of data to third party service providers.

The inventive system has various advantage over prior art systems. That the inventive system can use dynamically configured rules means more customizability and extensibility. The system has the ability to inspect and selectively tokenize or redact parts of a data payload. The system has the ability to selectively enrich data submitted as well as data received. The system only requires minimal integration by transport vs. code. The inventive system can be implemented through agentless, SaaS deployment. The system can provide LDAP-less permissioning (RBAC). The dynamic tokenization of the inventive system can include preconfigure tokens that can: expire after a time limit, expire after a specific number of usages, work only for a specific person or entity, work based on limited characteristics (geo fencing, ip-whitelisting, behavioral signature, device fingerprint), or some combination thereof.

The inventive system can use various dynamic processing strategies including: PDF by Pages, lines, or sections, JSON by field nested or otherwise, CSV, XML, and string credentials. The system can use multiple transport types including: HTTP, SFTP and TCP. The inventive system can enable compliance as a service. The inventive system can also allow users to utilize their own encryption keys, utilize their own vault infrastructure, or define their own tokenization format if configured by the system user.

Figure 14:
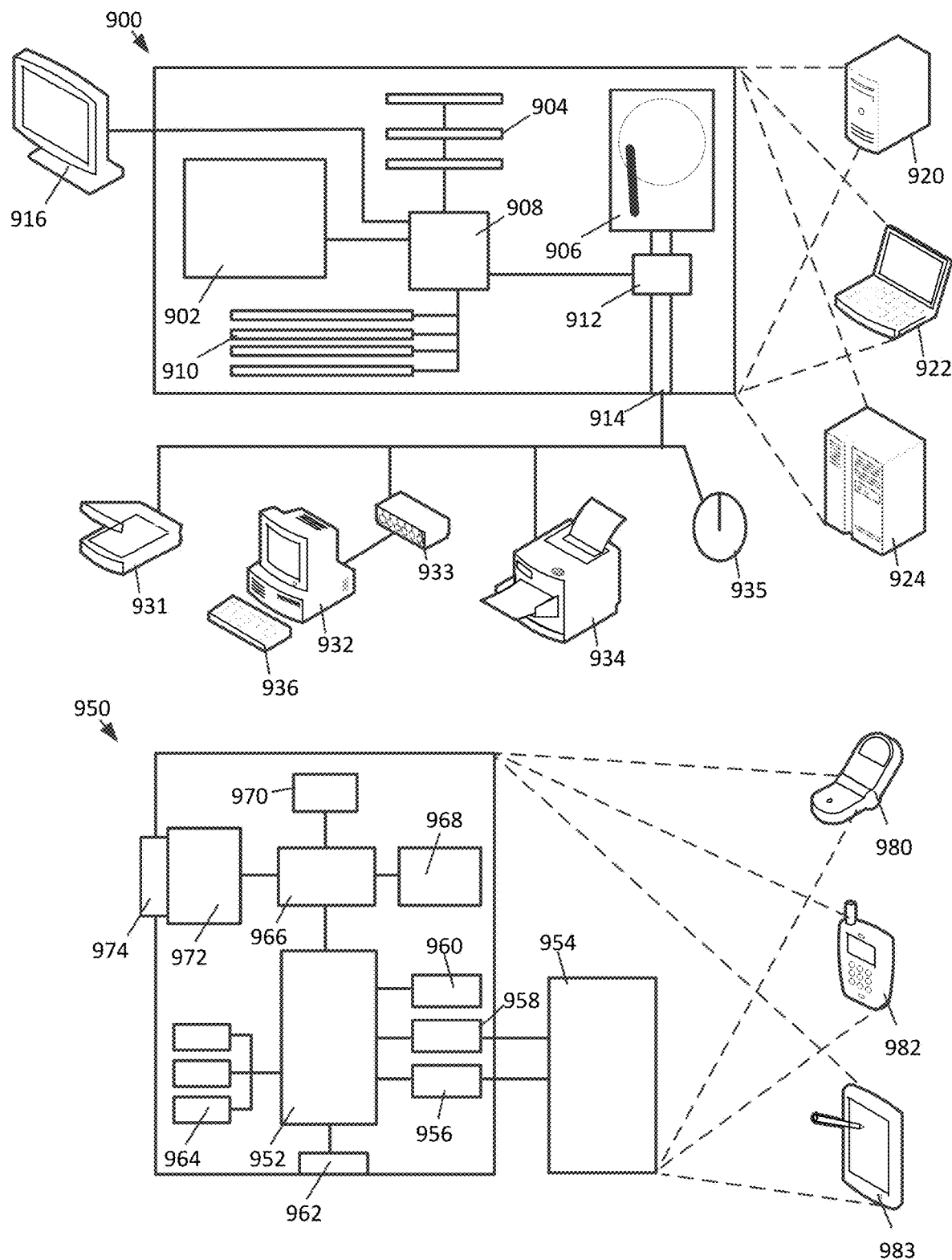
FIG. 14 illustrates a diagram of a computer system which can be used with the inventive system.

FIG. 14 shows an example of a generic computer device 900 and a generic mobile computer device 950, which may be used to implement the processes described herein, including the mobile-side and server-side processes for installing a computer program from a mobile device to a computer. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components processor 902, memory 904, storage device 906, high-speed interface 908, high-speed expansion ports 910, and low speed interface 912 are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple busses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port 914, which may include various communication ports (e.g., USB, Bluetooth, Ethernet, wireless Ethernet), may be coupled to one or more input/output devices, such as a keyboard 936 in communication with a computer 932, a pointing device 935, a scanner 931, or a networking device 933 such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a Microdrive, solid state memory or other device, to provide additional storage. Each of the components computing device 950, processor 952, memory 964, display 954, communication interface 966, and transceiver 968 are interconnected using various busses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, a tablet computer 983 or other similar mobile computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet. The computing system can include clients and servers. A client and server are generally remote from each other and typically interact through a communication network. The relationship of client and server arises by virtue of computer programs running on the respective computers and having a client-server relationship to each other.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. As a person skilled in the art will recognize from the previous detailed description and from the figures, modifications and changes can be made to the preferred embodiments of the invention without departing from the scope of this invention.

What is claimed is:

1. A method for securely processing data in a bi-directional data stream comprising:
    providing a computer server having a first network proxy, a data classifier, an operation pipeline, and a second network proxy;
    transmitting a first data payload from the first network proxy to the data classifier;
    transmitting the first data payload to the operation pipeline;
    processing the first data payload by performing a first pre operation, a first field operation and a first post operation by the operation pipeline;
    processing the first data payload by performing a second pre operation, a second field operation and a second post operation by the operation pipeline after the first field operation; and
    transmitting the first data payload from the operation pipeline through the data classifier to the second network proxy after the first field operation and the second field operation;
    wherein the first pre operation and the second pre operation are identifications of predefined confidential elements in the first data payload and wherein the first post operation and the second post operation are wrapping up and combining data in the first data payload and the first field operation and the second field operation are tokenization operations of the predefined confidential elements in the first data payload and tokens which replace the predefined confidential elements maintain formats of the predefined confidential elements.

2. The method of claim 1 wherein the first field operation and the second field operation are redaction operations of the predefined confidential elements in the first data payload.

3. The method of claim 1 wherein the predetermined confidential elements are stored in a vault database in communication with the operation pipeline.

4. The method of claim 1 further comprising:
    transmitting a second data payload from the second network proxy to the data classifier;
    transmitting the second data payload to the operation pipeline;
    processing the second data payload by the operation pipeline; and
    transmitting the second data payload from the operation pipeline through the data classifier to the first network proxy.

5. The method of claim 4 wherein the processing the second data payload by the operation pipeline includes replacing redactions with the predefined confidential elements.

6. The method of claim 4 wherein the processing the second data payload by the operation pipeline includes replacing tokens with the predefined confidential elements.

7. A method for securely processing data in a bi-directional data stream comprising:
    providing a computer server having a first network proxy, a data classifier, an operation pipeline, and a second network proxy;
    transmitting a request data payload from the first network proxy to the data classifier;
    transmitting the request data payload to the operation pipeline;
    processing the request data payload by performing a first request pre operation, a first request field operation and a first request post operation by the operation pipeline;
    processing the request data payload by performing a second request pre operation, a second request field operation and a second request post operation by the operation pipeline after the first request field operation; and
    transmitting the request data payload from the operation pipeline through the data classifier to the second network proxy after the first request field operation and the second request field operation;
    wherein the first request pre operation and the second request pre operation are identifications of predefined confidential elements in the first data payload and wherein the first request post operation and the second request post operation are wrapping up and combining data in the first data payload and the first request field operation and the second request field operation are tokenization operations of the predefined confidential elements in the first data payload and tokens which replace the predefined confidential elements maintain formats of the predefined confidential elements.

8. The method of claim 7 wherein the first request field operation and the second request field operation are redaction operations of the predefined confidential elements in the first request data payload.

9. The method of claim 7 wherein the predetermined confidential elements are stored in a vault database in communication with the operation pipeline.

10. The method of claim 8 further comprising:
    transmitting a response data payload from the second network proxy to the data classifier;
    transmitting the response data payload to the operation pipeline;
    processing the response data payload by performing a first response pre operation, a first response field operation and a first response post operation by the operation pipeline after the first response field operation;
    processing the response data payload by performing a second response pre operation, a second response field operation and a second response post operation by the operation pipeline after the first response field operation; and transmitting the response data payload from the operation pipeline through the data classifier to the first network proxy.

11. The method of claim 10 wherein the processing the response data payload by the operation pipeline includes replacing redactions with the predefined confidential elements.

12. The method of claim 10 wherein the processing the response data payload by the operation pipeline includes replacing tokens with the predefined confidential elements.

13. A method for securely processing data in a bi-directional data stream comprising:
   providing a computer server having a first network proxy, a data classifier, an operation pipeline, and a second network proxy;
   transmitting a request data payload from the first network proxy to the data classifier;
   transmitting the request data payload to the operation pipeline;
   processing the request data payload by performing a first request pre operation, a first request field operation and a first request post operation by the operation pipeline;
   processing the request data payload by performing a second request pre operation, a second request field operation and a second request post operation by the operation pipeline after the first request field operation;
   processing the request data payload by performing a third request pre operation, a third request field operation and a third request post operation by the operation pipeline after the second request field operation;
   transmitting the request data payload from the operation pipeline through the data classifier to the second network proxy after the first request field operation and the second request field operation;
   transmitting a response data payload from the second network proxy to the data classifier;
   transmitting the response data payload to the operation pipeline;
   processing the response data payload by performing a first response pre operation, a first response field operation and a first response post operation by the operation pipeline after the first response field operation;
   processing the response data payload by performing a second response pre operation, a second response field operation and a second response post operation by the operation pipeline after the first response field operation;
   processing the response data payload by performing a third response pre operation, a third response field operation and a third response post operation by the operation pipeline after the second response field operation; and
   transmitting the response data payload from the operation pipeline through the data classifier to the first network proxy;
   storing predetermined confidential elements in a vault database in communication with the operation pipeline;
   wherein the first request field operation, the second request field operation and the third request field operation are tokenization operations of the predefined confidential elements in the first data payload and tokens which replace the predefined confidential elements maintaining formats of the predefined confidential elements and wherein the response data payload by the operation pipeline includes replacing tokens with the predefined confidential elements or wherein the first request field operation, the second request field operation and the third request field operation are redaction operations of the predefined confidential elements in the first request data payload and wherein the processing of the response data payload by the operation pipeline includes replacing redactions with the predefined confidential elements stored in the vault database.

* * * * *